United States Patent [19]
Santini

[11] 3,938,270
[45] Feb. 17, 1976

[54] VISUAL DISPLAY DEVICE
[76] Inventor: Danilo J. Santini, Chicago, Ill.
[22] Filed: Apr. 15, 1974
[21] Appl. No.: 460,671

[52] U.S. Cl............. 40/130 K; 40/130 B; 240/1 EL
[51] Int. Cl.² ........................................ G09F 13/18
[58] Field of Search .......... 40/130 K, 130 R, 130 B; 240/1 EL, 10 R, 106; 350/96 B, 86

[56] References Cited
UNITED STATES PATENTS
2,740,957  4/1956  Davies............................ 40/130 KX Primary Examiner—Robert W. Michell
Assistant Examiner—John F. Pitrelli
Attorney, Agent, or Firm—Daniel Jay Tick

[57] ABSTRACT

A visual display device comprises a block of equilateral triangular cross-section. The block has two sides of trapezoidal configuration, a third side of rectangular configuration, a base of equilateral triangular configuration and a top of isosceles triangular configuration. The base is perpendicular to the three sides. The top triangle is at an angle of inclination with the base and has an angle at the corner joining the two opaque sides of trapezoidal configuration and an opaque opposite side coincident with the top edge of the third side and farther from the base than the angle. A light is provided at the base of the block.

1 Claim, 7 Drawing Figures

VISUAL DISPLAY DEVICE

DESCRIPTION OF THE INVENTION

The present invention relates to a visual display device.

Objects of the invention are to provide a visual display device of simple structure, which is inexpensive in manufacture, provides many different color patterns of different hues and shadows of a highly interesting and attractive nature, which vary with the direction of view, and is especially adaptable for providing patterns, hues and shadows relating visually to stereophonic sound reproduction and responsive to the frequency and/or volume of such reproduction.

In order that the invention may be readily carried into effect, it will now be described with reference to the accompanying drawing, wherein.

In the FIGS., the same components are identified by the same reference numerals.

Figure 2:
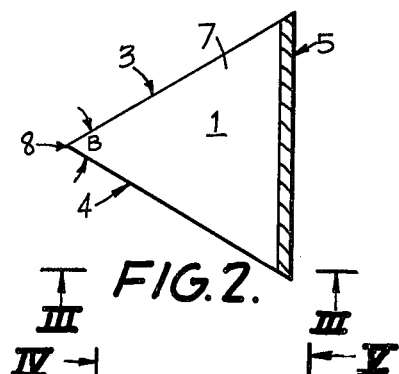
FIG. 2 is a top view of an embodiment of the visual display device of the invention.
Figure 6:
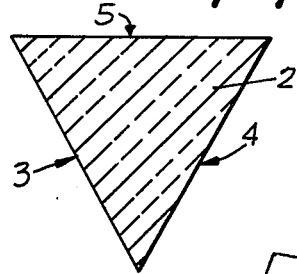
FIG. 6 is a cross-sectional view, taken along the lines VI—VI, of FIG. 4.
Figure 4:
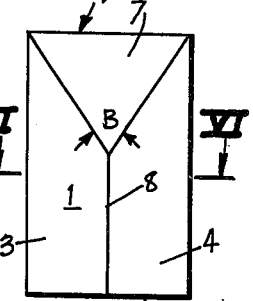
FIG. 4 is a view, taken along the lines IV—IV, of FIG. 3.
Figure 5:
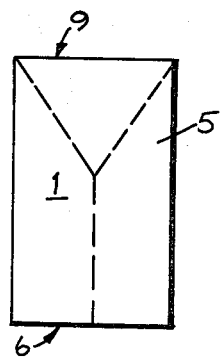
FIG. 5 is a view, taken along the lines V—V, of FIG. 3.

The visual display device of the invention comprises a block 1 (FIGS. 2 to 5) of substantially equalateral triangular cross-section 2 (FIG. 6). The block 1 has two opaque sides 3 and 4 (FIGS. 2, 4 and 6) of trapezoidal configuration, a third side 5 (FIGS. 2, 3, 5 and 6) of rectangular configuration, a base 6 (FIGS. 3, 4 and 5) of equilateral triangular configuration and an opaque top 7 (FIGS. 2, 3 and 4) of isosceles triangular configuration.

The base 6 is substantially perpendicular to the three sides 3, 4 and 5. The top triangle 7 is at an angle of inclination A (FIG. 3) with the base 6 and has an angle B (FIG. 2) at the corner 8 (FIGS. 2 and 4) joining the two sides 3 and 4 of trapezoidal configuration and an opposite side 9 (FIGS. 4 and 5) coincident with the top edge of the third side 5 and farther from the base 6 than is the angle A.

A light such as, for example, a lamp 10 (FIG. 3) is provided at the base of the block 1.

A support device such as, for example, a slot, may be provided on the block 1 for removably supporting the third side 5. This would permit plates of different colors to be utilized as the third side 5. The third side preferably comprises a plate of colored translucent material.

The top 7 and trapezoidal sides 3 and 4 are, as previously mentioned, opaque, and preferably have a white reflecting surface.

Figure 1:
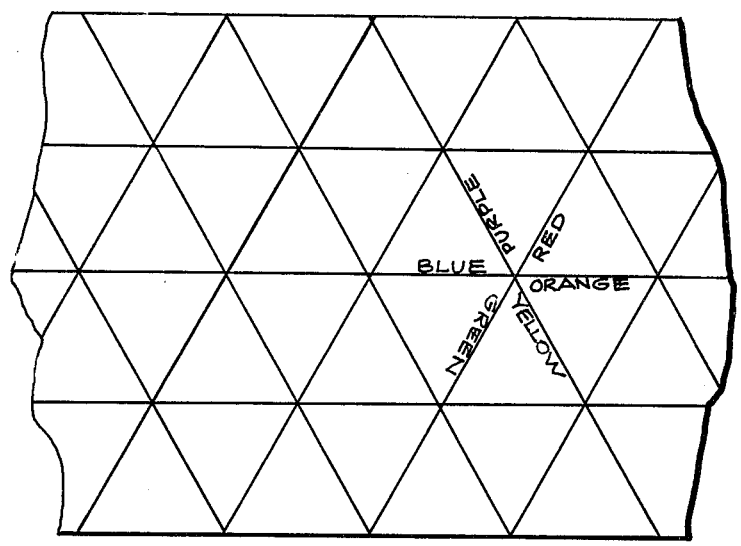
FIG. 1 is a top plan of a plurality of visual display devices of the invention in a preferred pattern thereof.
Figure 7:
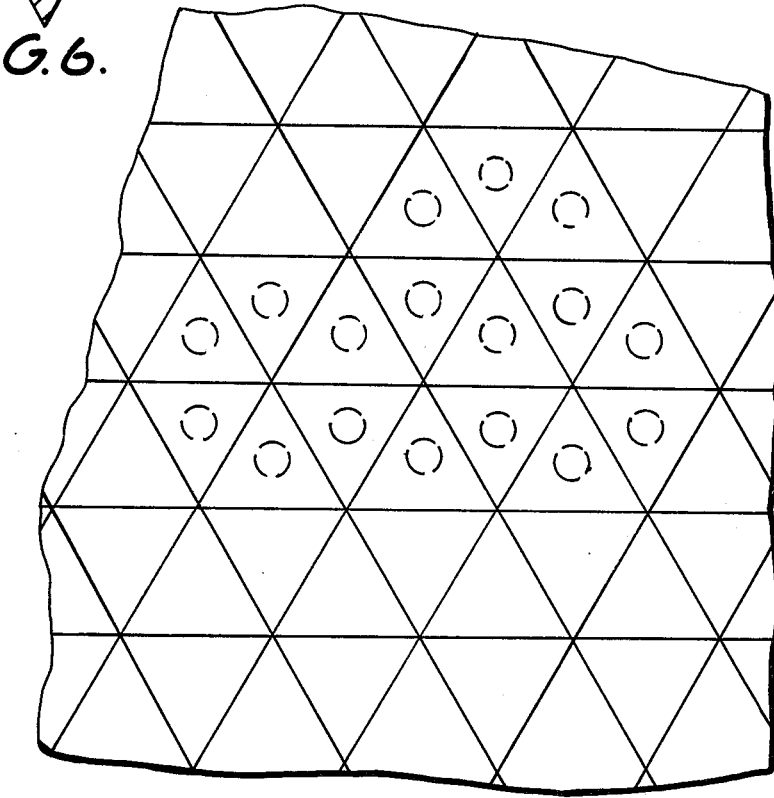
FIG. 7 is a top plan of a plurality of visual display devices of the invention in a possible pattern thereof.

As shown in FIGS. 1 and 7, a plurality of blocks of the invention are positioned in next-adjacent side by side relation, each block being identical to the block of FIGS. 2 to 6, hereinbefore described. A plurality of lights, indicated by broken line circles in FIG. 7, are provided, each at a base of a corresponding one of the blocks.

Figure 3:
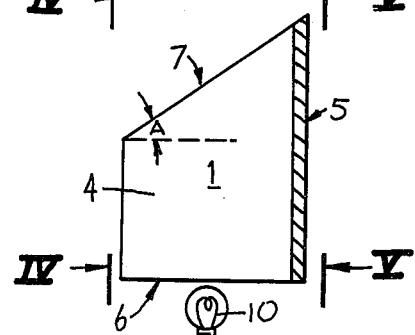
FIG. 3 is a view, taken along the lines III—III, of FIG. 2.

The angle A shown in FIG. 3 is the angle of reflectance and is determined in accordance with the materials used. Each of the blocks 1 may be hollow or solid. The blocks may also be utilized as children's toys.

While the invention has been described by means of a specific example and in a specific embodiment, I do not wish to be limited thereto, for obvious modifications will occur to those skilled in the art without departing from the spirit and scope of the invention.

I claim:

1. A visual display device, comprising
    a plurality of blocks in next-adjacent side by side relation, each block being of substantially equilateral triangular cross-section and having two opaque sides of trapezoidal configuration, a third at least translucent, colored side of rectangular configuration, an at least translucent base of equilateral triangular configuration and an opaque top of isosceles triangular configuration, the base being substantially perpendicular to the three sides and the top triangle being at an angle of inclination with the base and having an angle at the corner joining the two sides of trapezoidal configuration and an opposite side coincident with the top edge of the third side and farther from the base than the angle; and
    a plurality of light means each at the base of a corresponding one of the blocks, said blocks being arranged with said third side of at least one of said blocks adjacent a trapezoidal side of another of said blocks, such that light is transmitted only through said translucent third side, so that an opaque top of a given block derives colored light from adjacent blocks and not directly from the light means at its base, said translucent colored third side of at least one block being of varying color with respect to other third sides of said plurality of blocks.

* * * * *